US007515267B2

(12) United States Patent
Ehbets et al.

(10) Patent No.: US 7,515,267 B2
(45) Date of Patent: Apr. 7, 2009

(54) METHOD FOR DETERMINING COLOR AND/OR DENSITY VALUES AND PRINTING APPARATUS CONFIGURED FOR THE METHOD

(75) Inventors: Peter Ehbets, Zürich (CH); Wolfgang Geissler, Bad Schönborn (DE); Adrian Kohlbrenner, Thalwil (CH)

(73) Assignee: Heidelberger Druckmaschinen AG, Heidelberg (DE)

( * ) Notice: Subject to any disclaimer, the term of this patent is extended or adjusted under 35 U.S.C. 154(b) by 129 days.

(21) Appl. No.: 11/593,184

(22) Filed: Nov. 3, 2006

(65) Prior Publication Data

US 2007/0081204 A1 Apr. 12, 2007

Related U.S. Application Data

(63) Continuation of application No. PCT/EP2005/004608, filed on Apr. 29, 2005.

(30) Foreign Application Priority Data

May 3, 2004 (DE) ....................... 10 2004 021 599

(51) Int. Cl.
*G01N 21/25* (2006.01)

(52) U.S. Cl. .......................... 356/416; 347/19; 101/130

(58) Field of Classification Search ......... 356/402–425; 101/130; 347/19

See application file for complete search history.

(56) References Cited

U.S. PATENT DOCUMENTS

| | | | | |
|---|---|---|---|---|
| 4,575,249 | A | 3/1986 | Grieger | |
| 4,660,159 | A | 4/1987 | Ott | |
| 5,182,721 | A * | 1/1993 | Kipphan et al. | 382/112 |
| 5,724,259 | A | 3/1998 | Seymour et al. | |
| 5,808,746 | A * | 9/1998 | Koishi et al. | 356/445 |
| 5,927,195 | A * | 7/1999 | Volz et al. | 101/183 |
| 6,744,077 | B2 * | 6/2004 | Trottier et al. | 257/103 |

FOREIGN PATENT DOCUMENTS

| | | | |
|---|---|---|---|
| DE | 27 34 156 | | 2/1978 |
| DE | 37 07 027 | A1 | 9/1988 |
| DE | 195 38 811 | A1 | 11/1996 |
| EP | 0 091 500 | A1 | 10/1983 |
| EP | 1 033 247 | A1 | 9/2000 |

* cited by examiner

*Primary Examiner*—Kara E Geisel
*Assistant Examiner*—Abdullahi Nur
(74) *Attorney, Agent, or Firm*—Laurence A. Greenberg; Werner H. Stemer; Ralph E. Locher

(57) ABSTRACT

In a method for determining color and/or density values for use in monitoring and regulating a printing process in a printing apparatus, specifically in a sheet-fed offset printing press, measuring areas of a printed sheet are measured photoelectrically during the printing process, directly in or on the running printing apparatus. From the measured values obtained in the process, the color and/or density values for the relevant measuring areas are formed. From the measurement, measured value deviations caused directly in the printing process with respect to a measurement outside the printing process can be corrected computationally.

34 Claims, 7 Drawing Sheets

METHOD FOR DETERMINING COLOR AND/OR DENSITY VALUES AND PRINTING APPARATUS CONFIGURED FOR THE METHOD

CROSS-REFERENCE TO RELATED APPLICATIONS

This is a continuing application, under 35 U.S.C. §120, of copending international application PCT/EP2005/004608, filed Apr. 29, 2005, which designated the United States; this application also claims the priority, under 35 U.S.C. §119, of German patent application DE 10 2004 021 599.5, filed May 3, 2004; the prior applications are herewith incorporated by reference in their entirety.

BACKGROUND OF THE INVENTION

Field of the Invention

The invention relates to a method for determining color and/or density values for monitoring and regulating a printing process in a printing apparatus. Measuring areas of a printed sheet are measured photoelectrically during the printing process, directly in or on a running printing apparatus, and from the measured values obtained in the process the color and/or density values for the relevant measuring areas are determined.

In such a generic method, the measured values are measured directly during the printing process by using a measuring configuration which is incorporated within the printing apparatus, for example a sheet-fed offset printing press or, generally, a printer. This type of measured value registration or measurement will be designated “in-line” in the following text. As opposed to this, “external” designates measured value registration outside the printing apparatus in a stable state of the printed product.

At the time of the in-line measurement, that is to say during the printing process, the application of color is not yet stable. The disruptive effects during the application of color are caused by various parameters of the printing process. In addition, the appearance of the printed product can be changed further by subsequent processing steps, for example varnishing of the surface. Both effects lead to differences between the measured values measured in-line and the corresponding measured values determined externally into a stable state of the printed product. Measured values determined in-line and externally are therefore not directly comparable.

SUMMARY OF THE INVENTION

It is accordingly an object of the invention to provide a method for determining color and/or density values and a printing apparatus configured for the method which overcome the above-mentioned disadvantages of the prior art methods and devices of this general type, which corrects for deviations in the color and density values.

With the foregoing and other objects in view there is provided, in accordance with the invention, a method for determining color and/or density values for use in monitoring and regulating a printing process in a printing apparatus. The method includes measuring, photoelectrically, measuring areas of a printed sheet during a printing process, directly in or on the printing apparatus resulting in measured values. From the measured values obtained in the printing process the color and/or density values are determined for the measuring areas. Measured value deviations caused directly in the printing process with respect to a measurement performed outside the printing apparatus are corrected computationally using the measured values.

According to the most general idea of the invention, the aforementioned correction of the measuring differences is achieved by computational correction measures and preferably in conjunction with a specific configuration of the measuring technique. In the following text, the invention will be described by using the example of sheet-fed offset printing. However, the approaches according to the invention apply generally and can also be used for other printing processes and apparatus.

Colorimetry, as described for example by the Commission International De L’éclairage (CIE) in the CIE publication 15.2 “Colorimetry”, and the standards for the color and density measuring technique to be used (e.g. DIN 5033, ISO 5), permit an absolute description of a color value. This standard forms the basis for color communication in modern digital workflow and color management systems. CIE-conformant color values (XYZ or L*a*b*) are used in order to transfer the color information from the subject from the input stage (original, camera, scanner, monitor) via the digital proof print, the prepress stage, as far as the printing press. For efficient transformation of the absolute CIE color values into machine control parameters (e.g. color separation into the primary colors C, M, Y and K), process standards have been defined. One process standard for offset printing technology is defined in the DIN/ISO 12647-2 standard. The use of the process standard permits flexible processing of a print job with different printing presses. However, it requires characterization, setting and stable operation of the printing press in accordance with the stipulations of the process standard.

The measuring techniques used must be able to output color and density values that conform to the standard for these tasks. This can be achieved, for example, by a combination of a three-range color measuring instrument and a densitometer. Ideally, however, a spectrophotometer is used as the measuring technique, since it supports both measuring modes and allows flexibility in the selection of the density filters.

The current state of color measuring technology in the printing sector is represented by two types of measuring systems. These include portable handheld measuring instruments, such as the SpectroEye spectrophotometer and the D19 densitometer from Gretag-Macbeth AG, and semiautomated measuring systems such as AxisControl and ImageControl with spectrophotometric measuring heads from Heidelberger Druckmaschinen AG.

These measuring instruments and systems are used externally, that is to say outside the printing press. Using the handheld measuring instrument, the printer is able to inspect individual measuring areas in the print control strip or in the image. Using the semiautomated systems, the printer is able to put a single printed sheet in place. Depending on the system, the complete print control strip (AxisControl) or the entire sheet (ImageControl) is then measured automatically. These measuring systems use measuring geometries that meet the standard. The original used is a finished printed end product in a stable state. The measured values obtained in this way correspond to the CIE-conformant color measured values and can be used directly for regulating and monitoring or controlling the printing process, for color communication or for the display.

In order to be able to carry out print jobs more efficiently and more economically, the trend is toward automated printing presses. For the color measuring technology, therefore the measurements are no longer carried out manually by the printer outside the printing press but fully automatically, directly in the printing press. The in-line measuring technique offers great advantages. By incorporating the in-line measuring technique in a closed control loop with the individual printing units, the printing press can be brought into color automatically and quickly. In addition, the inking can be checked and readjusted constantly during continuous printing, which permits continuous quality control.

The in-line measuring technique is, however, considerably more complex than the conventional external, measuring technique. The in-line measurement has to be carried out shortly after the application of color. At this time, the color layer is not yet stable. It is influenced by different printing process parameters and ink properties, which decay with different time constants. As a result, depending on the situation, large differences can arise between the in-line measured values and corresponding external measured values on stable dry samples. In addition, the dependence on the process makes the interpretation of the measured data more difficult. It cannot be seen unambiguously whether a measured variation has been caused by a change in the application of color or by a change in the process parameters. A similar problem arises when the printed product is processed further after the in-line measurement. A typical example is the application of a varnish layer in a subsequent varnishing unit.

The present invention deals specifically with the in-line measurement in sheet-fed offset printing presses but is also suitable for other printing processes and apparatus. As already mentioned, the invention substantially includes a specific configuration of the measuring technology and measuring geometry as well as correction methods for the in-line measured values, which permit conversion into color and density measured values that meet the standard for corresponding stable external samples (printed products).

In-line measuring systems can be obtained for web-fed offset printing presses, for example the ColorControlSystem (CCS) from QuadTech. However, these systems are incorporated at the end of the web-fed offset printing press, after the drying systems. At the time of the measurement, the printed material is already dry and in a stable state. Process-dependent correction of the measured values is not necessary here.

On the other hand, in flexographic, gravure and web-fed offset printing presses, what are known as "web inspection" systems are also used for the color measurement and inspection. One example is the Print-Vision 9000 NT system from Advanced Vision Technology (AVT). These systems use imaging measuring techniques which image the printing original on two-dimensional or one-dimensional CCD sensors. The color values have been determined with non-conformant filter functions and correspond to camera-specific RGB values. These measured values are transformed into CIE color values. The conversion of the measured values does not correspond to a correction that depends on the printing process but a calorimetric characterization of the measuring system, as is also used in conventional color management systems for monitor, camera and scanner profiling. A general description of this technique will be found in the publication "Digital Color Management, Encoding Solutions" by E. Giorgianni.

Other features which are considered as characteristic for the invention are set forth in the appended claims.

Although the invention is illustrated and described herein as embodied in a method for determining color and/or density values and a printing apparatus configured for the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
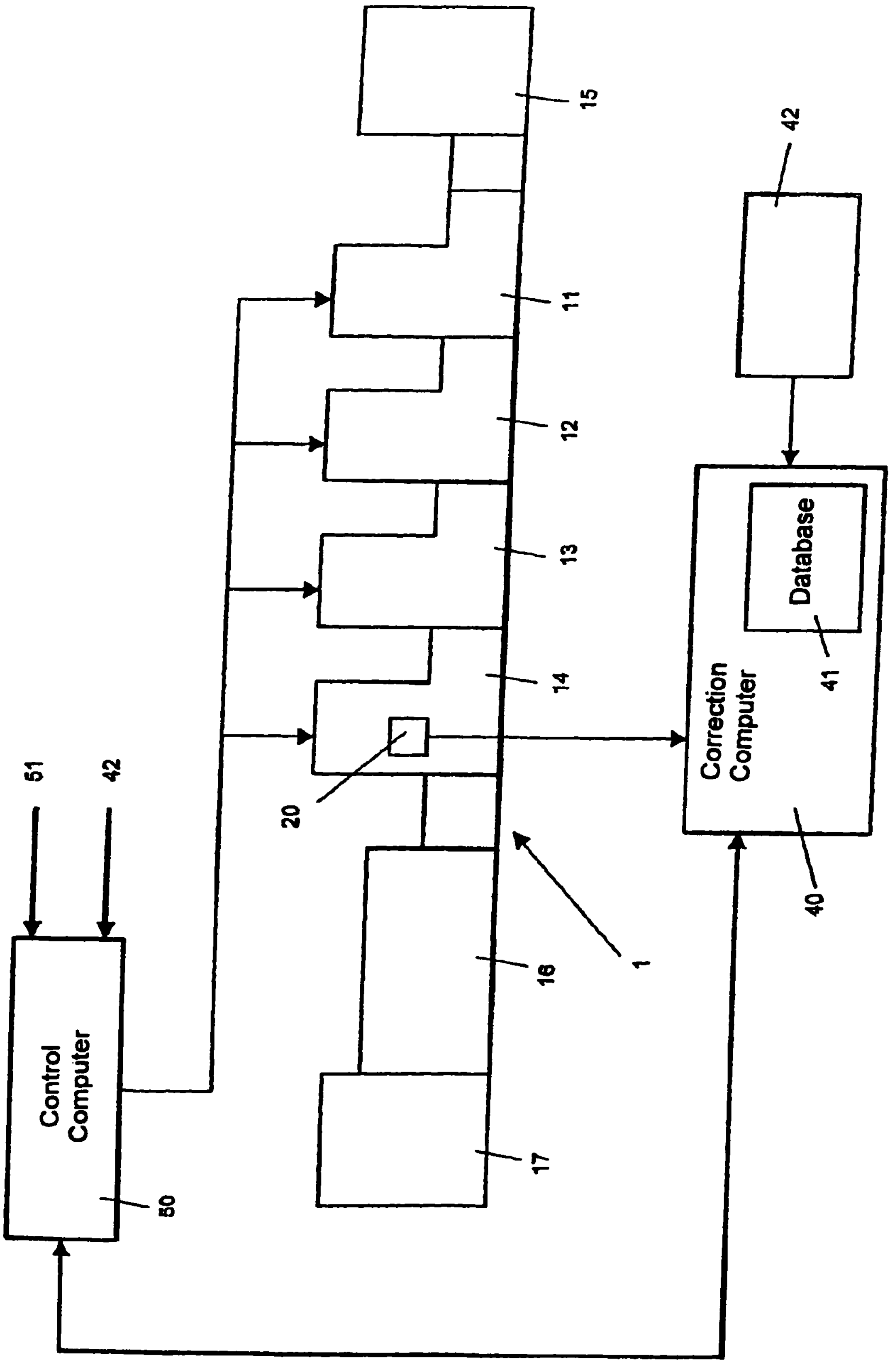
FIG. 1 is a diagrammatic illustration of an exemplary embodiment of a printing apparatus according to the invention.

Referring now to the figures of the drawing in detail and first, particularly, to FIG. 1 thereof, there is shown a sheet-fed offset printing press is designated overall by 1. The printing press has four (or possibly even more) printing units 11-14 and prints sheets which are provided at a feeder 15, as it is known. The sheets are first printed with a first color in the first printing unit 11, then passed onto the second printing unit 12, until ultimately, finally printed with all the colors, they leave the last printing unit 14. Provided on the last printing unit 14 is a measuring configuration 20, which measures the sheets (at their measuring points provided for that purpose) immediately after printing. The printed sheets are then supplied to further processing stages, for example a dryer unit and a varnishing unit 16, and finally output in a deliverer 17, as it is known. Apart from the measurement during the printing process or immediately thereafter, the printing press is to this extent prior art, so that those skilled in the art require no further explanation.

The in-line measuring configuration 20 contains, in a manner known per se, one or more measuring heads measuring simultaneously. The measuring heads can also be incorporated into different printing units. For reasons of cost, however, it is expedient to combine the measurement of the colors of all the printing units involved at a common location after the last printing unit. The measuring heads are preferably disposed in a row at right angles to the printing direction. The measuring configuration 20 also includes an automated linear movement device at right angles to the printing direction, so that each point over the sheet width can be approached and measured. The mechanical formation of an automated measuring configuration having a plurality of measuring heads is known per se and to this extent requires no more detailed explanation.

Also illustrated in FIG. 1 is a correction computer 40, which obtains the measured values registered by the measuring configuration and, following the correction, supplies these to a control computer 50, which ultimately controls the printing units 11-14 of the printing press 1 in a manner known per se. The correction computer 40 and its functions will be discussed further below.

At high printing speeds, the measurement is carried out directly after the application of color in the last printing unit. The time difference between the measurement and color application is only a fraction of a second. Research report number 52.023 from Fogra contains pictures which show the state of the color layer immediately after the ink splitting at the press nip. In these pictures, the production of threads, what are known as microstripes, between a blanket and printed sheet can be seen. These threads have diameters of 30 to 60 micrometers and, after a specific distance from the press nip, break off. The result is a color layer having a surface modulation that is macroscopic in relation to the layer thickness and which, at the time of the in-line measurement, has not yet decayed. During the measurement of the color from the last printing unit, the surface modulation is caused directly by the thread formation of the ink splitting. During the measurement of colors from front printing units, a reduced effect occurs, which is caused by the interaction of the fresh ink on the printed sheet with the blanket of the last printing unit. In this case, an emulsion of ink residues and damping solution is applied to the color layer.

The surface modulations of the color layer influence the measured values. They depend on a large number of printing process parameters, such as printing speed, printing unit, substrate and color type. In addition, differences between in-line and externally determined measured values are also caused by the drying behavior of the color on the substrate, which has a considerably longer time constant.

The differences between in-line and externally determined measured values have to be corrected for the practical use of the measured values. The method according to the invention uses a metrological component (specific design of the measuring configuration 20) for this correction, and also computational components, the latter of which are carried out in the correction computer 40.

The aim of the metrological component is to reduce the influence of the process-dependent disruptive effects to the maximum and, if possible, to supply unambiguous measured values. In addition, for the design of the measuring technique, additional boundary conditions often have to be taken into account, such as limitations on overall space in the printing press or a varying measuring distance, which boundary conditions can be taken into account, according to a further aspect of the invention, by deviations from the standardized 0°/45° measuring geometry. The remaining measured value deviations as compared with externally determined measured values that meet the standard are then compensated for by numerical corrective measures or models in the correction computer 40.

The arrows in FIG. 1 represent the data flow of the measured values. The measured values can be density values, color values or reflectance spectra, depending on the measuring technique used in the measuring configuration 20. In actual fact, the data flow between the components is bidirectional. The measured data registered by the measuring configuration is transmitted to the correction computer 40 in digital form. The latter corrects the measured data and passes it on to the control computer 50 of the printing press 1. The corrected measured data can be displayed for the printer by the control computer 50, stored or used for the color control of the printing press. In this case, in a manner known per se, the (corrected) measured data can be compared with desired values 51 for the color control and, from this, the settings of the printing units 11-14 can be determined and transmitted electronically to the latter.

For the conversion of the measured values, the correction computer 40 needs process-specific correction parameters, which are provided in a correction database 41. For the selection of the correction parameters from the database 41, the correction computer 40 needs information 42 about the current printing process. The necessary information 42, for example substrate type, color type and printing unit assignment, is selected or entered by the printer on a non-illustrated control desk of the printing press 1 and, in practice, is transmitted to the correction computer 40 via the control computer 50.

In the following text, the specific configuration of the measuring configuration 20 according to the invention will be explained in more detail by using FIGS. 2, 3A and 3B.

As already mentioned, the measuring unit 20 contains a beam in which there are a plurality of measuring heads 21 mounted in a row transversely with respect to the paper running direction, the beam being incorporated at the end of the last printing unit of an offset printing press. The measuring heads 21 themselves are mounted on a motor-driven carriage which, under electronic control, can be moved within the beam transversely with respect to the paper running direction. In this way, it is possible to register any desired measuring locations on the paper.

In order to be able to utilize the small amount of space in the printing press, the measuring configuration 20 also has, in addition to the measuring heads 21, separate measuring heads for determining the paper and register position. In addition, the measuring configuration is connected to a rotary encoder of the printing unit, so that the measuring sequence can be synchronized with the rotational movement of the press cylinder.

Figure 2:
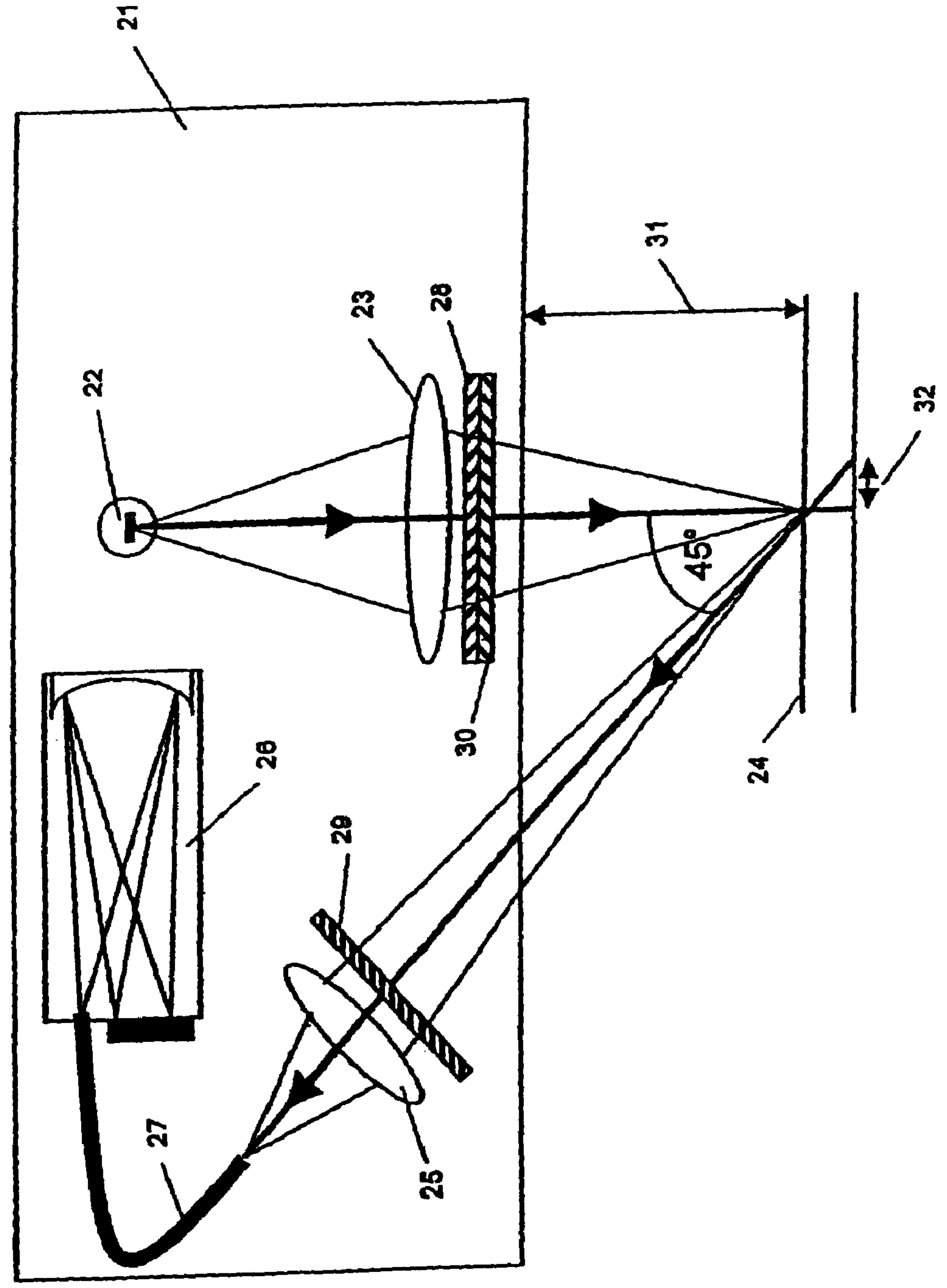
FIG. 2 is a basic schematic illustration of a measuring configuration that operates spectrally and is suitable for use in the printing apparatus according to FIG. 1.
Figure 3A:
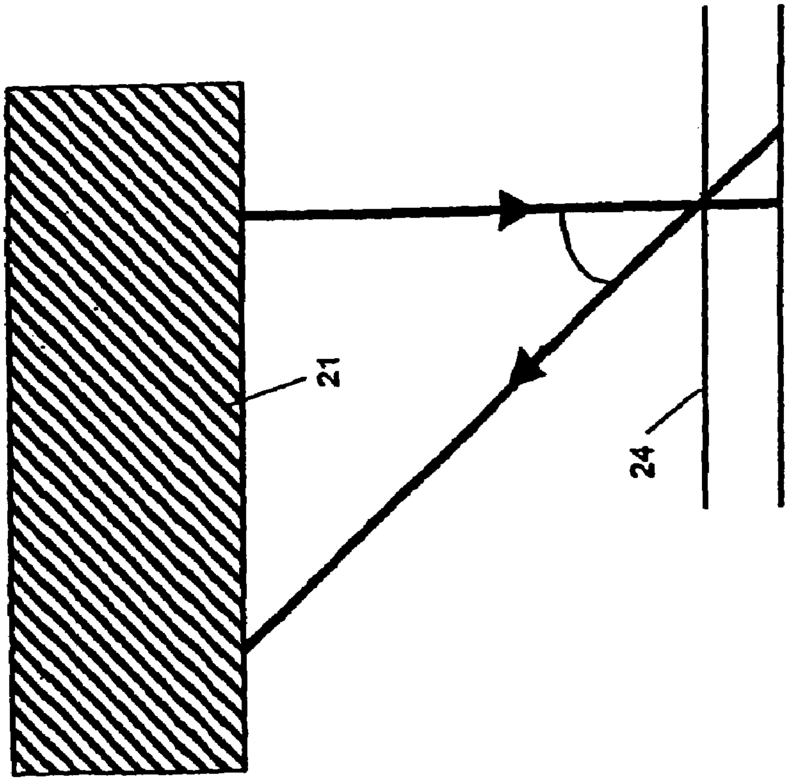
FIGS. 3A and 3B are two sketches to explain a measuring geometry according to the invention.
Figure 3B:
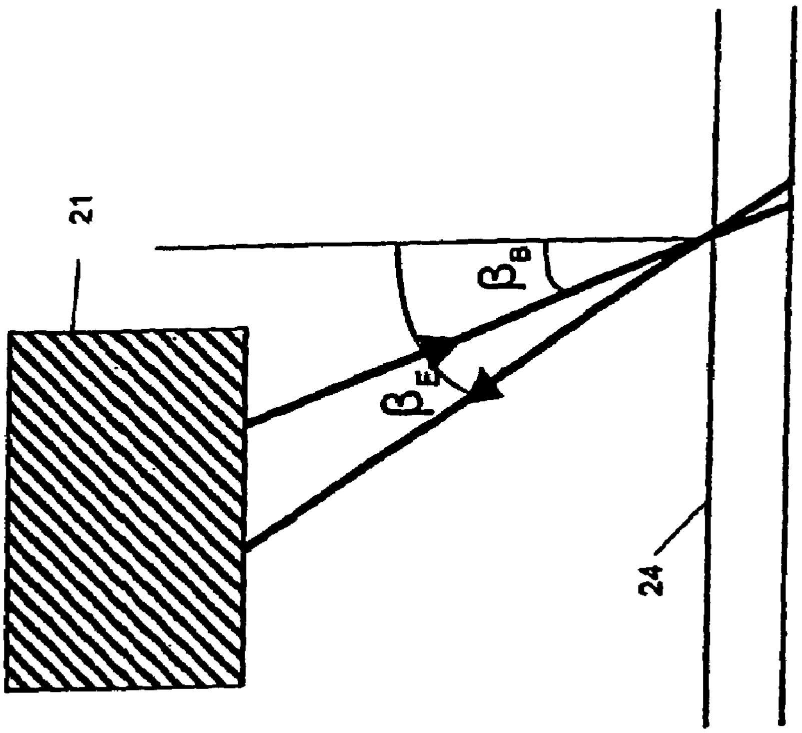

A typical measuring head 21 is illustrated schematically in FIG. 2. The measuring geometry corresponds to the color measuring standard 0°/45° according to DIN 5033. In this case, the illumination by a light source 22 is carried out at 0° and is projected into a measuring plane 24 by an optical system 23. The light source 22 preferably used is a central flash light source, whose light is led to the individual measuring heads by a fiber multiple distributor. The measuring light reflected from the measuring point on the printed sheet is registered at 45°. An optical system 25 projects the measuring spot in the measuring plane onto an analyzer 26. The analyzer 26 is illustrated as a photodiode array grating spectrometer having fiber injection 27. In this configuration, the measuring head 21 corresponds to a spectrophotometer. To this extent, the configuration of such a measuring head corresponds to the known prior art and therefore requires no further explanation. In principle, all known techniques for the spectral analysis of the reflected light from the sample can be used. Alternatively, the converse measuring geometry 45°/0° with interchanged illumination and receiver channels can also be used.

In the following text, the case of a spectral measurement technique over the entire visible range will be described. In this case, the measured values are a reflectance spectrum which corresponds to the level of the spectral reflectance from the sample from typically 400 to 700 nm with a spectral resolution of 10 or 20 nm. Density and three-range color measuring heads use only a portion of the spectrum. The metrological aspects and the correction models for these spectral portions are, however, identical with the general case and can be derived directly from the spectral case.

As already mentioned, the in-line measuring techniques must be able to supply measured values that are compatible with an external reference. The external reference is defined by measured values on a stable sample using a spectrophotometer that meets the standard with 0°/45° measuring geometry. In this connection, a stable sample refers to the case where the effects of the ink splitting have decayed and that the sample has been finally processed. In addition, the color layer must be in a defined external state.

The in-line measuring configuration must suppress the varying surface structure for this reason. To this end, according to one aspect of the invention, polarization filters 28 and 29 are used in the illumination and receiver channel of the measuring head 21. The polarization filters contain linear polarizers and are incorporated in the illumination and receiver channel with polarization axes at right angles to each other. The use of polarization filters is known per se in the case of density measurement in handheld measuring instruments. A description of this technique is contained in the publication "Farbe und Qualität" [Color and Quality] from Heidelberger Druckmaschinen AG. The use according to the invention of polarization filters during the in-line measurement for the purpose of eliminating or suppressing the surface effect, that is to say the suppression of those components of the measured light which are reflected directly on the structured surface of the color layer has not been described previously in the literature, however.

A further specific configuration of the measuring technique is that, in addition to the polarization filters 28 in the illumination channel, a UV filter 30 is incorporated, which suppresses the ultraviolet (UV) component of the illumination spectrum below 400 nm. The UV blocking filter 30 can be implemented, for example, by using a filter glass of the GG420 type from the Schott company. The UV blocking filter 30 prevents the fluorescence of the brightener additives in the paper being excited. As a result, for the in-line measurement, improved reproducibility of the measured data from sheet to sheet and above all from job to job is achieved, since the brightener components in the paper can fluctuate. In addition, by using the UV blocking filter 30, the agreement with the external reference values is improved, since the external measuring instrument can use a different illumination source.

Further boundary conditions in the printing press can influence the configuration of the measuring configuration 20, for example limited overall space in the printing press or incorrect paper attitude in the measuring plane. According to a further important aspect of the invention, these boundary conditions can be taken into account by a measuring geometry deviating from the standardized 0°/45° measuring geometry.

FIG. 2 shows that a distance 31 from a lower edge of the measuring head 21 to the measuring plane 24 has a critical influence on the overall size of the measuring configuration 20. This is because, in the standard geometry, it determines the distance between the illumination and receiver channel at the lower edge of the measuring configuration. In addition, it can be seen that the receiver and illumination channels are displaced laterally with respect to each other in the measuring plane (arrow 32) if the measuring distance 31 changes. The mutual displacement limits the working range of the measuring optics.

An improvement for the overall space and the working range is achieved if illumination and receiver channels are disposed on the same side of the perpendicular to the measuring plane. This configuration according to the invention is illustrated in FIG. 3B. In comparison with this, FIG. 3A shows a standard 0°/45° geometry. In the event of a change in the measuring distance, the lateral offset between illumination and receiver is reduced. In FIG. 3B, the measuring angles no longer correspond to the standard geometry. Since each deviation from the standard geometry inevitably also entails measured value deviations, the new measuring angles have to be chosen in such a way that the result is the smallest possible deviations with respect to the measurement with standard geometry. Since measurements are made with the use of polarization filters, this requirement corresponds to the condition that the path lengths of the light beams in the color layer are identical for the various measuring geometries. This corresponds to the same absorption behavior. The condition for equal absorption paths in the color layer can be described to a first approximation by the following equation [1]:

$$\frac{1}{\cos(\beta_B)} + \frac{1}{\cos(\beta_E)} = 1 + \frac{1}{\cos(\alpha_E)} = 2.13 \qquad [1]$$

Here:

$\beta_B$ is a mean angle of illumination in the color layer with refractive index n;

$\beta_E$ is a mean receiver angle in the color layer with refractive index n;

$\alpha_E$ is the receiver angle in standard geometry in the color layer ($n \sin(\alpha_E) = \sin 45°$); and n is the refractive index of the color layer n=1.5.

The corresponding angle of illumination and receiver angle in air can be calculated on the basis of the angles in the color layer by the known refraction law (H. Haferkorn, Optik [Optics], page 40).

Figure 4:
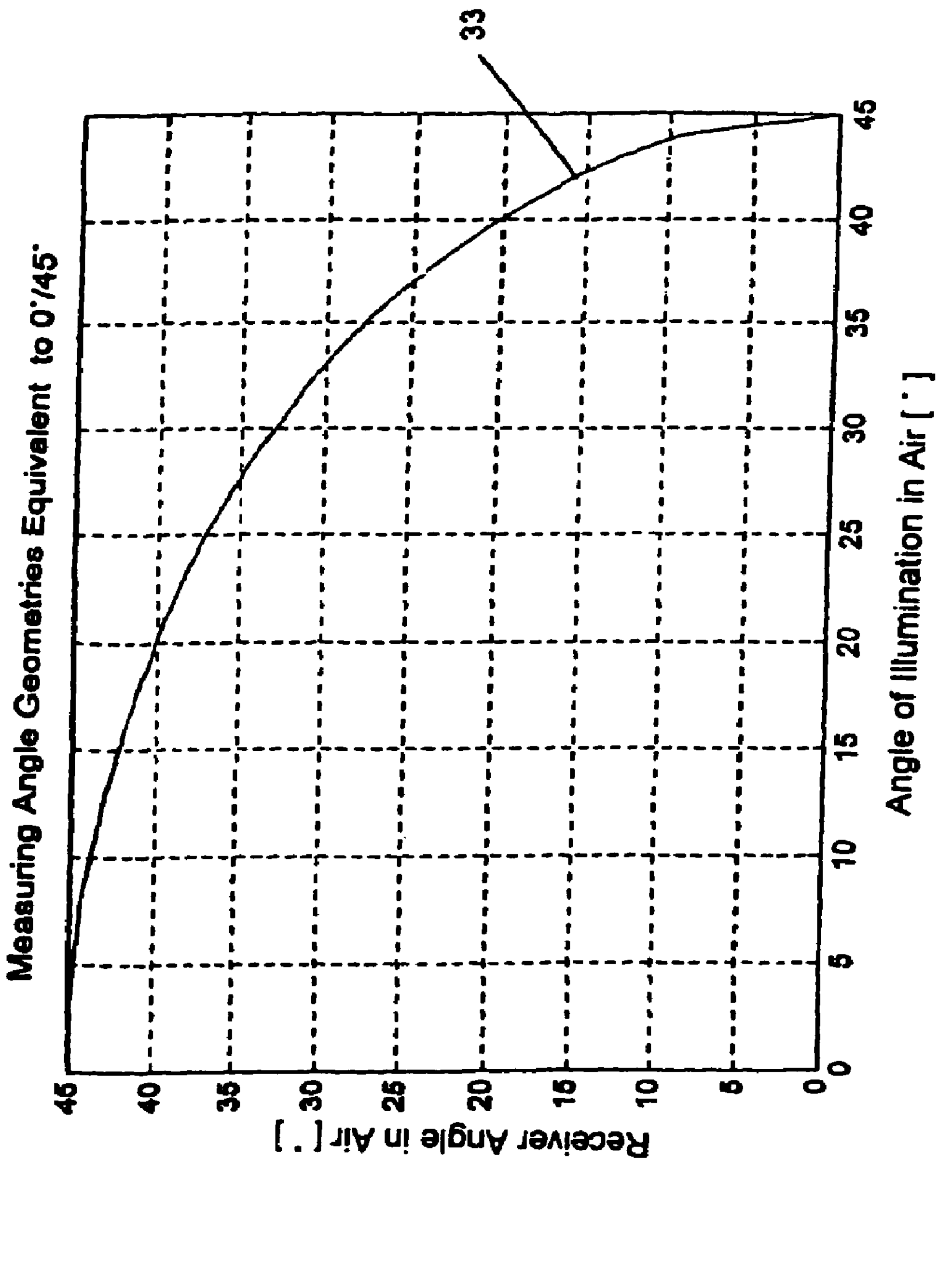
FIG. 4 is a graph to explain the measuring geometry of FIGS. 3A and 3B.

The combinations of illumination and receiver angles in air which satisfy equation [1] are illustrated in FIG. 4 in the form of a graph. In this case, the coordinate axes designate the angle of illumination and the receiver angle in air; the points on curve 33 each correspond to a pair of angles for the measuring geometry. Particularly expedient and advantageous for the in-line measurement are angles of illumination of more than 10° with the corresponding receiver angles of less than 45°.

The measuring geometry according to the invention explained above is also of interest for a measuring technique without polarization filters. The crossed polarization filters give rise to a high signal loss and cannot be used if, for example, a weak light source has to be used. In this case, too, it is necessary to reduce the reflection component from the modulated surfaces. According to further aspect of the invention, this is achieved in that the illumination channel is tilted in the direction of the receiver channel. In FIG. 3B it can be seen that, as a result, the angular separation between the directed reflection from the surface and the receiver angle is enlarged. In this case, the measuring angles should also satisfy equation [1]. Advantageous measuring geometries are angles of illumination in the range from 10° to 15° and receiver angles in the range from 40° to 45°.

In the following text, the computational correction measures for the measured values and the fundamental correction module will be explained in more detail.

The aim of all correction measures, that is to say both the metrological and the computational, is to make the in-line measured values compatible with corresponding external reference values. In this case, reference values is understood to mean those measured values which are obtained with a color measuring instrument that meets the standard on finally printed sheets outside the printing press. For the correction of the measured values, three different states are distinguished, which are defined more accurately in the following text.

State 1 corresponds to the in-line measurement in the printing press with the measuring configuration 20. At the measuring time, the color layer on the substrate is still wet. In addition, the surface of the color layer is highly disrupted by the effects of ink splitting at the last printing unit.

State 2 corresponds to the situation where a sheet is removed from the deliverer 17 directly after the printing process and a color measurement is made thereon. In the state 2, the color layer is still wet. The effects of ink splitting have already decayed. The surface of the color layer can be assumed to be smooth and reflective with maximum gloss; only a minimal surface effect still occurs.

State 3 corresponds to the situation where the color measurement is carried out on a printed sheet with completely dried ink. The drying process typically lasts for several hours. In this state, the color film has assumed the microscopic surface roughness of the substrate. In the case of coated papers, the color layer remains on the substrate during the drying process; the thickness of the color layer on the substrate is maintained. In the case of uncoated papers, part or even all of the quantity of colored pigments penetrate into the substrate during the drying process. This effect changes the density and color measured values and must be corrected.

The correction models according to the invention described further below permit the conversion of the measured values between these three states. Conversion in both directions is possible.

Figure 5:
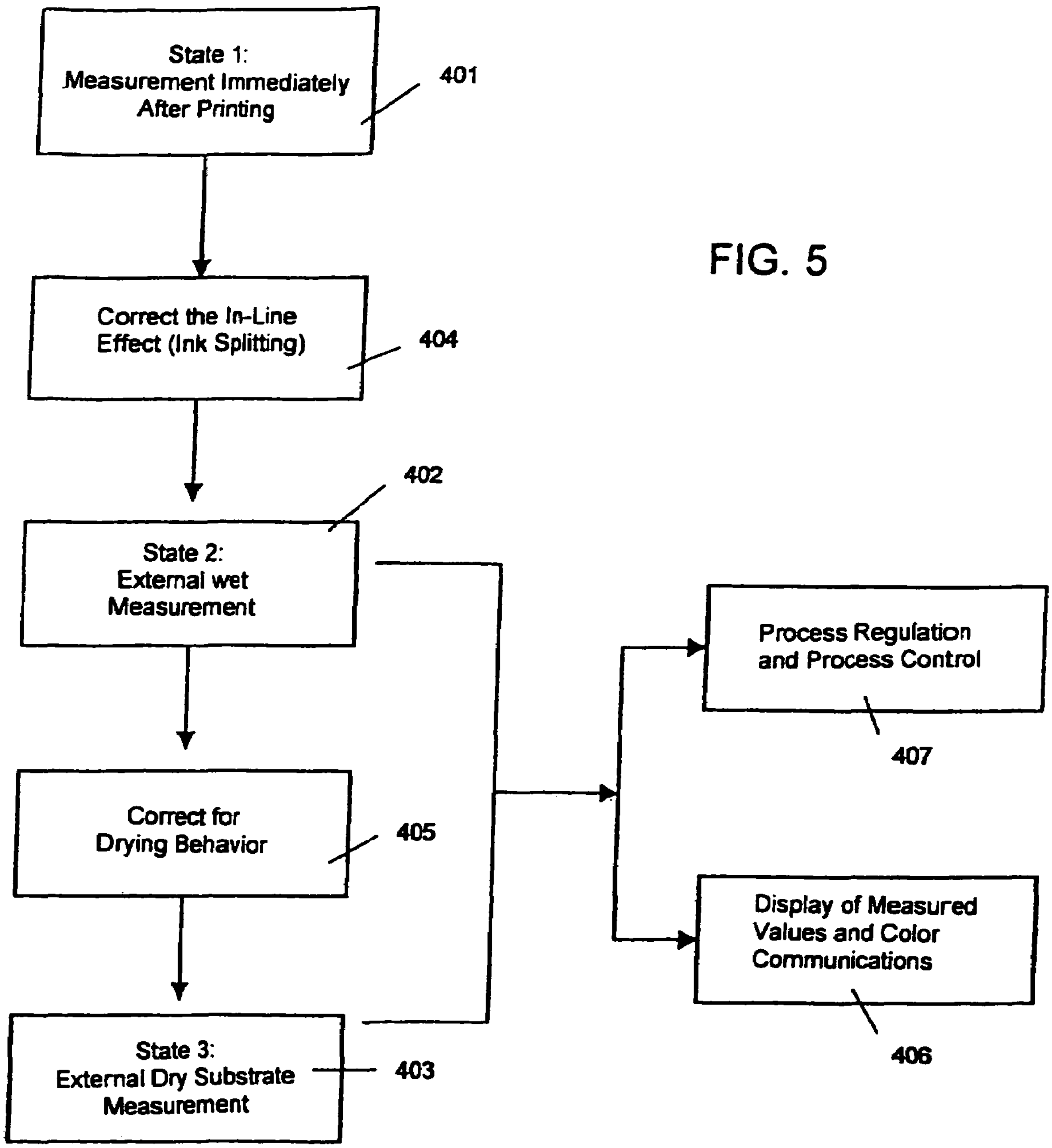
FIG. 5 is a flow chart for explaining the method according to the invention.

For the practical implementation, according to the invention, a sequential sequence is advantageously chosen, that is to say the in-line measured values corresponding to state 1 supplied by the measuring configuration 20 are first transformed into measured values corresponding to state 2 (external measurement, wet) and then these measured values corresponding to state 2 are transformed into measured values corresponding to state 3 (external measurement, dry). This sequential correction sequence is illustrated schematically in FIG. 5. The correction of the measured values from state 1 (block 401) to state 2 (block 402) mainly includes the correction of the effects of ink splitting (block 404). The correction from state 2 (block 402) to state 3 (block 403) corresponds to the correction of the drying behavior of the color layer on the specific substrate type (block 405). In this implementation, there is just one external reference state (state 2, block 402) into which all in-line measured values (block 401) are transformed. Starting from this state 2, the measured data is then processed further for all applications. The typical applications are display of the measured values (block 406), storage of the measured values as desired values for the print job (block 407), communication of the desired values to another printing press (block 406) and use as a current actual value for the color control (block 407).

For the determination of reference values in states 2 and 3, it is expedient that an external measuring instrument is used together with the in-line measuring configuration 20. The corrected measured values in states 2 and 3 must correspond to the reference values which correspond to the measurement with a spectrophotometer, color measuring or density measuring instrument that meets the standard. In order to keep metrological differences between the in-line and the external measurement small, the external reference values are carried out with a measuring instrument which is equipped with the same measuring filters as in the in-line measuring configuration 20. Therefore, in the preferred implementation of the method, the external reference values are determined with a measuring instrument which is equipped with polarization filters and a UV blocking filter.

If the in-line measuring configuration 20 and the external measuring instrument do not use the same bandwidth, for example a spectrophotometer with 10 nm or 20 nm spectral resolution, a numerical bandpass correction is carried out. The bandpass correction can be carried out as described in the ISO 13655 standard (ISO Standard 13655, Graphic Technology—Spectral measurement and calorimetric computation for graphic arts images, Annex A, 1996).

Furthermore, it is expedient that, together with the in-line measuring configuration 20, an external measuring instrument is used which has replaceable measuring filters in the illumination and receiver channels. The measuring instrument should support the measuring modes without filter, with UV blocking filter and with polarization filters. One exemplary embodiment of such a measuring instrument is the SpectroEye spectrophotometer from Gretag-Macbeth AG. This functionality permits the acceptance or the transmission of measured values from or to other measuring systems which use other measuring filters. The external measuring instrument can measure a printed reference sheet in all measuring modes. The measured values with the appropriate measuring filter can then be passed on to the in-line measuring configuration 20 or to another external system. This permits in particular the acceptance of desired values for the color control which have been measured with other measuring filters.

If the measured density values on the reference sheet do not correspond to the required desired density, the transformed measured values can be adapted by using a correction module which changes the layer thickness. This transformation can be carried out by using the model for the layer thickness modulation which is described in the following text.

The following sections describe the theoretical basis for the computational correction measures (correction algorithms) according to the invention. In the first section, the correction of the in-line measuring errors will be described; in the second section the correction of the drying behavior will be described. The practical application of the correction algorithms and the concrete implementation of the entire correction system are then described.

The starting point for the correction or compensation of the in-line measuring errors is the color layer at the time of the in-line measurement with a modulated surface. The result of the correction must be a measured value that is compatible with the external state 2, which corresponds to a homogeneous color layer.

The necessary correction parameters and degrees of freedom and their influence are derived from a color model which simulates the metrological behavior of the color layer.

The color model is based on the Hoffmann theory, which permits an accurate physical description of the reflection factor of a single, homogeneous, non-scattering color layer on a diffusely reflective substrate. The Hoffman theory is laid out for a diffuse measuring geometry. The adaptation for the reflection factor in the 0°/45° measuring geometry is described in equation [2]:

$$R = c_0 R_0 + \frac{(l - R_0) e^{-ad/\cos\theta_2} \rho_p I_A}{\sin^2(\alpha_l)(l - \rho_p I_p)} \qquad [2]$$

where $c_0$ is the proportion of the surface reflection which is measured at 0°;

$R_0$ is the surface reflection coefficient for a 45° angle of incidence in air;

$\alpha$ is the absorption coefficient of the color layer;

d is the layer thickness of the color layer;

$\theta_2$ is the angle of incidence in medium 2 (color film) with refractive index $n_2$: $n_2\sin(\theta_2)=n_1\sin(\theta_1)$;

$\theta_1$ is the angle of incidence in air at 45° with a refractive index n1;

$\rho_p$ is the level of diffuse reflection from the substrate;

$\sin^2(\alpha_1)$ is the normalization factor for absolute white for a measuring geometry with registration angle $\alpha_1=5°$;

$I_A$ is the integral for the measured proportion of the diffuse beam flux coupled out of the color layer;

$I_p$ is the integral for the diffuse beam flux reflected back in the color layer; and $R_{21}$ is the internal reflection coefficient in the color layer with respect to air (from medium 2 to medium 1).

$R_0$ and $R_{21}$, are calculated with the Fresnel formulae (H. Haferkorn, Optik, page 50):

$$I_A = 2\int_0^{\alpha_2}(1-R_{21})e^{-\alpha d/\cos\theta}\cos\theta\sin\theta\,d\theta$$

$$I_A = 2\int_0^{\pi/2}R_{21}e^{-2\alpha d/\cos\theta}\cos\theta\sin\theta\,d\theta$$

In the following text, the correction models for full-tone areas surface-modulated macroscopically by the ink (color) splitting will be explained. The adaptation for halftone areas can be carried out with the known Neugebauer theory.

It can be seen from equation [2] that the reflection factor R is formed from two additive components. The first component corresponds to the surface effect and can be described as a reflection difference:

$$\Delta R_0=c_0R_0 \qquad [3]$$

In equation [3], $c_0$ is a correction function that depends on the critical printing process parameters.

As described further above, the surface effect is preferably eliminated by metrological measures, that is to say by the use of polarization filters in the measuring configuration 20. In this case, it is possible to assume that $c_0=0$. If polarization filters cannot be used, the surface effects must be corrected numerically. The amplitude of the surface effect is influenced by the critical printing process parameters. The correction function $c_0$ or the dependence on the printing process parameters is determined experimentally. The general method for this purpose will be explained further below.

The second component in equation [2] contains the absorption by the printing ink and the multiple reflections at the interfaces of the color layer. The multiple reflections are designated light capture in the specialist literature.

The modulated surface of the color layer following ink splitting influences the absorption behavior and the light capture. The behavior and the influence of the two effects can be derived as follows.

The modulation of the surface leads to the thickness of the color layer at specific points being less than the corresponding layer thickness without modulation. As a result of this effect, the mean absorption power of the color layer is reduced. The effect can therefore be described in equation [2] by an adaptation of the product of the absorption coefficient $\alpha$ and layer thickness d. One possibility for the implementation is multiplication by a process-dependent correction factor $c_1$, which, in the function of the layer thickness modulation, assumes values less than or equal to 1. The values following the correction of the layer thickness modulation are described by equation [4]

$$\alpha d_c=\alpha d\, c_1. \qquad [4]$$

Where $\alpha d_c$ is to be inserted into equation [2] instead of $\alpha d$. $c_1$ is a correction function that depends on the critical printing process parameters and, as explained further below, can be determined experimentally by using characterization measurements.

The modulated surface also influences the light capture of the color layer, since the modulation influences the angle of incidence of the light beams and thus the limiting angle for the total reflection at the surface. An elegant implementation of this dependence in equation [2] is achieved, according to the invention, by the refractive index of the color layer $n_2$ being varied in the calculation. The surface modulation reduces the mean limiting angle for the total reflection, which results in that more light remains captured in the color layer. This behavior corresponds to an increase in the refractive index $n_2$. One possibility for the correction of the light capture is described in equation [5]:

$$n_{2c}=n_2c_2, \qquad [5]$$

where $n_2$ is the refractive index following the correction and $c_2$ is a multiplicative correction function which, like the correction functions $c_0$ and $c_1$, is process-dependent and must be characterized experimentally.

The correction of the in-line measuring errors can therefore be implemented with three different error types, namely surface effect, layer thickness modulation and light capture in accordance with equations [2] to [5]. For the correction, the three correction functions $c_0$, $c_1$, $c_2$ are used, which are configured in the function of the printing process parameters and whose appropriate values are stored in the correction database 41 already mentioned.

The described correction of the in-line errors by using the exact color model according to equation [2] is certainly readily possible but the numerical implementation is relatively complicated.

A more efficient numerical implementation is obtained if use is made of the Kubelka-Munk theory for the color model, taking the surface phenomena into account (Saunderson correction). This model corresponds to the prior art. An extensive description of this theory is given in the thesis "Modèles de prédiction de couleurs appliquées à l'impression jet d'encre" [Models for Predicting Colors Applied by Inkjet Printing] by P. Emmel (Thesis no. 1857, 1998, Ecole Polytechnique Féderale de Lausanne).

The Kubelka-Munk theory applies to a diffuse measuring geometry and scattering color layers. Nevertheless, it can be used for the phenomenological explanation of the effects of the in-line measuring errors in the 45°/0° measuring geometry and their correction.

The reflection factor of an absorbent color layer on a diffusely scattering substrate can be described by the following equation $$R = c_0R_o + \frac{(1-R_0)(1-R_2)\rho_p e^{-Kd}}{1-R_2\rho_p e^{-Kd}}, \qquad [6]$$

in which $R_2$ signifies the diffuse reflection coefficient in the color layer ($R_2=0.6$);

K signifies the diffuse absorption coefficient; and $\rho_p$ signifies the diffuse reflectance of the substrate.

The first additive component $c_0R_0$ again corresponds to the surface effect and is identical to equation [2].

In equation [6], a diffuse absorption coefficient K is introduced. It does not correspond to the material absorption $\alpha$ in equation [2]. For a diffuse flux, $K=2\alpha$ can be assumed as an approximation.

The advantage of the Kubelka-Munk approach is that equation [6] can simply be inverted, that is to say the absorption spectrum (extinction E) can be determined directly from the reflectance measurement. This relationship is illustrated in equation [7].

$$e^{-E}=e^{-Kd}=\frac{R-c_0R_0}{\rho_p((1-R_0)(1-R_2)+R_2(R-c_0R))} \quad [7]$$

A comparison of equations [2] and [6] shows that the multiple reflections and the absorption are assessed differently. In this application, a color does not need to be described in absolute terms. A relative measured value correction must be carried out. The spectral extinction E of the color can therefore be determined from equation [7] and used as a model parameter.

The three error types for the correction of the in-line measuring errors from equations [2] to [5] can be assigned equivalent errors in the Kubelka-Munk description:

The surface effect is identical to equation [3], $$\Delta R_0=c_0R_0 \quad [3]$$

The layer thickness modulation according to equation [4] is implemented as a multiplicative correction to the extinction:

$$E_c=Ec_1 \quad [8]$$

The correction to the light capture is implemented in the Kubelka-Munk model as a scaling of the diffuse internal reflection coefficient R, $$R_{2c}=R_2c_2, \quad [9]$$

Here, $c_0$, $c_1$ and $c_2$ are again process-parameter-dependent correction functions.

Figure 6:
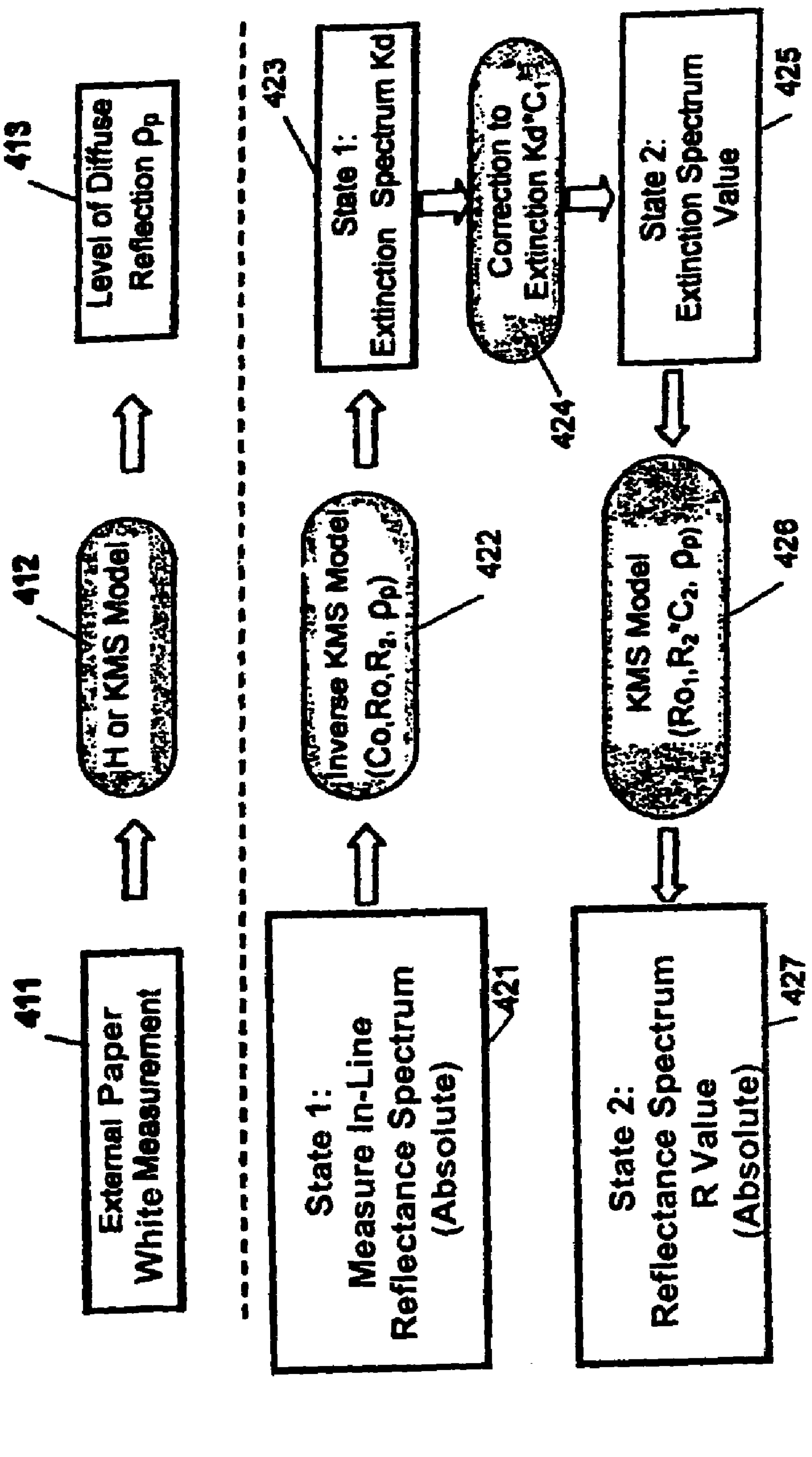
FIG. 6 is a block schematic diagram of a specific exemplary embodiment of the method according to the invention.

The application of the algorithm to the correction of the in-line measuring errors with a color model is illustrated schematically in FIG. 6. The sequence illustrated corresponds to the correction of a spectral measured value from the reflectance spectrum. The correction to the entire reflectance spectrum is achieved by the correction cycle being carried out for each reference point of the spectrum.

As a first step in the correction cycle, the measured absolute reflectance value of the substrate (paper white measurement, block 411) is used to determine the level of diffuse reflection $\rho_p$ of the substrate (block 413). The reflectance $\rho_p$ can be calculated with the Hoffmann model (H) from equation [2] or the Kubelka-Munk-Saunderson model (KMS) from equation [6] for a color layer without absorption and without surface effect (block 412). This corresponds to the following parameter values in equations [2] and [3]:

$$c_0=K=\alpha=0,\ R_0=0.04.$$

From the measured in-line reflectance spectrum in state 1 (block 421), by using the inverse KMS model according to equation [7] (block 422), the extinction spectrum E (block 423) of state 1 is calculated. The fixed model parameters are $R_0=0.04$, $R_2=0.60$, and the level of diffuse reflection of the substrate $\rho_p$ calculated in step 1. For the correction of the surface value, the correction function $c_0$ that applies to the concrete print job and to the concrete printing process parameters are read in from the correction database 41 and applied.

On the extinction value E (block 423), the correction to the layer thickness modulation according to equation [8] is carried out (block 424). The corresponding correction function $c_1$ is again read in from the correction database 41. The result of this operation is the extinction value according to external state 2 (block 425).

As the next step, the extinction value according to state 2 (block 425) is transformed into the reflectance value of state 2 (block 427). The direct KMS model in equation [6] is used for this purpose. During this operation (block 426), the correction to the light capture is made. The internal reflection factor $R_2$ is multiplied by the appropriate correction function $c_2$, which is also read in from the correction database 41. During this transformation, the surface effect is set equal to zero.

Alternatively, the correction to the in-line measured values can also be carried out without color model. In this case, the correction is advantageously carried out directly on the measured reflectance value R or the corresponding density value D. The density value D is calculated from the reflectance value R in accordance with the known formula:

$$D=-\log_{10}(R) \quad [10]$$

It is expedient that, even in this case, the measured value deviation can be considered as assembled from the three error types surface effect, layer thickness modulation and light capture and corrected accordingly.

For this purpose, the surface effect is calculated in a manner identical to equation [3] as an additive component to the reflection factor R.

Figure 7A:
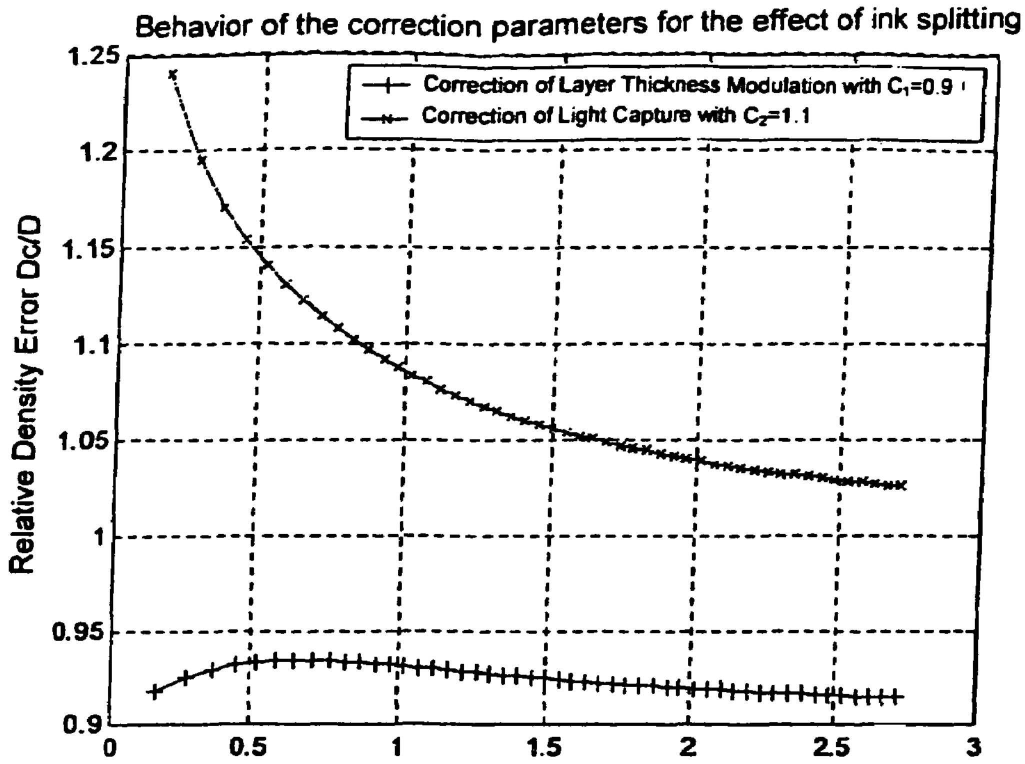
FIGS. 7A and 7B are two graphs to explain computational measured value corrections performed in accordance with the method according to the invention.
Figure 7B:
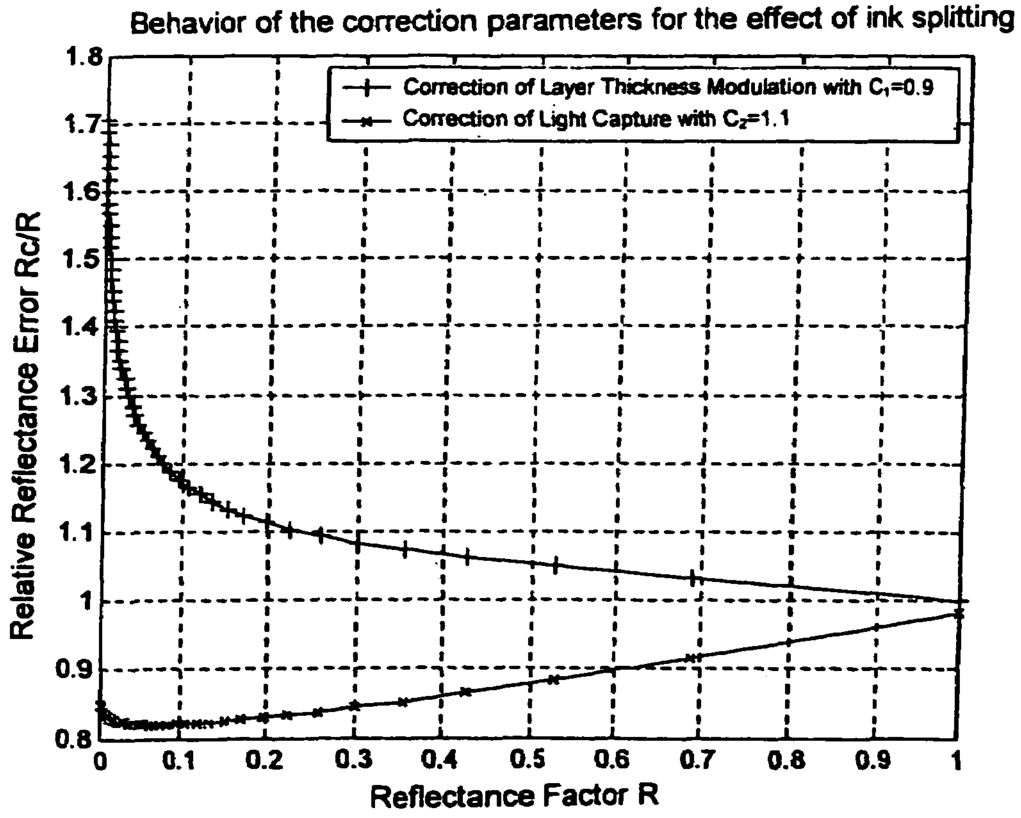

The behavior of the correction to the layer thickness modulation according to equation [4] and the correction to the light capture according to equation [5] simulated with the Hoffmann model according to equation [2] is illustrated in FIGS. 7A and 7B. The graph of FIG. 7A illustrates the behavior of the relative density error Dc/D in the function of the density value D for the two correction types. The graph of FIG. 7B shows the behavior of the relative reflectance error Rc/R in the function of the reflectance value R for the two correction types.

The behavior of the correction to the layer thickness modulation exhibits a constant relative density error in the function of the density. For the direct correction method without color model, it is therefore expedient to implement the layer thickness modulation error as a multiplicative correction to the measured density value D according to equation [11]:

$$D_c=Dc_1, \quad [11]$$

where $c_1$ is again a process-dependent correction function which is read in from the correction database.

In an analogous way, the behavior of the light capture error in FIGS. 7A and 7B shows that this error type for the direct correction without color model is best implemented as a scaling factor of the reflectance value R:

$$R_c=Rc_2, \quad [12]$$

where $c_2$ is again a process-dependent correction function which is read in from the correction database.

FIGS. 7A and 7B also show that the layer thickness modulation error and the light capture error have different signs and may compensate for each other. This behavior can cause numerical instabilities during the correction. For this reason, according to a further aspect of the invention, a threshold value $D_s$ is introduced for the correction with and without color model. For high densities, the layer thickness modulation error is mainly dominant. For lower densities, the error caused by the light capture is dominant. The distinction between high and low densities is made by the threshold value, which is preferably selected in the region of about 1.0.

According to an advantageous and particularly expedient development of the method according to the invention, for a density value D greater than $D_s$ only the layer thickness modulation error is implemented in accordance with the appropriate equations [4], [8] or [11] for a correction with or without color model. Conversely, for a density value D less than $D_s$ only the error of the light capture is implemented in accordance with equations [5], [9] or [12] for a correction with or without color model.

The correction to the drying effect permits the transformation of the measured values of state 2 (external wet) to measured values of state 3 (external dry).

It is known that on coated paper the drying process primarily corresponds to a change in the microscopic surface structure. When polarization filters are used for the color measurement, this effect is eliminated. Therefore, no correction to the drying effect is needed on coated papers when using polarization filters. Without polarization filters, the surface effect has to be taken into account in accordance with equation [3] as an additive reflectance component.

On uncoated papers, some of the color layer penetrates into the substrate. This behavior requires additional correction parameters. The use of a color model for this purpose is in principle possible. It requires an approach which is able to simulate two color layers lying over the paper. One layer corresponds to the color component which has penetrated into the paper. The upper layer corresponds to the remaining quantity of color which has remained on the paper. One possibility for the implementation is the application of the multilayer Kubelka-Munk model from the thesis by P. Emmel already mentioned. However, the correction using a multilayer color model and the determination of the model parameters becomes complex. Therefore, according to a further aspect of the invention, a direct correction is made to the measured values, as described further above in conjunction with equations [11] and [12].

The drying behavior on coated and uncoated papers is likewise characterized, according to the invention, by using the three error types surface effect, layer thickness modulation and light capture, and is corrected accordingly. The necessary correction functions $c_0$, $c_1$, $c_2$ (following their determination) are likewise deposited in the correction database 41 and correspond to a second data set in addition to the correction functions for the correction of the in-line errors.

In the following text, the method according to the invention will be summarized clearly once more by using a preferred exemplary embodiment.

The correction computer 40 is connected to the measuring configuration 20 and receives from the latter, for each measuring area that is scanned, the data from the spectra registered. In addition, the control computer 50 transmits to the correction computer 40 the environmental parameters belonging to each measured area, that is to say machine, process and measuring area parameters. These parameters are, in detail: printing speed, number of the printing unit in which the measuring configuration 20 is located, paper class (e.g. glossy paper, matt paper, uncoated paper), color type class (e.g. scale color cyan), measuring area type (e.g. full-tone, 70% halftone, gray) and the number of the printing unit in which the measuring area has been printed. The correction is carried out in relation to a specific case, an individual case defining a specific combination of environmental parameters. For instance, the combination of "glossy paper", "scale color magenta", "full-tone area" and "printed on the last printing unit" is one case. In the correction database 41 located in the correction computer 40, each case occurring in practice is assigned suitable correction parameters, which define the already mentioned sets of (configured) correction functions $c_0$, $c_1$ and $c_2$.

The correction database 41 is implemented as a table, in which one correction case is treated in each line. An individual line contains a set of condition parameters (corresponding to the environmental parameters) and a set of correction parameters. The correction computer 40 compares the critical environmental parameters with the condition parameters in the correction database 41 for each measurement. For this purpose, the table is processed line by line until a first agreement is found. In this way, the suitable case and therefore the suitable correction parameters are found. The table is run through from top (table start) to bottom (table end). The cases are ordered in the table in accordance with the level of specificity, the table beginning with very specific cases and ending with very generic cases. An attempt is therefore always made first to carry out a specific correction. If no cases are defined for this purpose, the correction becomes more generic step by step.

In the correction computer 40, during each measurement for each individual value of the uncorrected reflectance spectrum, the decision is made as to whether this lies in the absorption, transmission or transition range of the color. To this end, the reflectance values of the individual wavelengths (spectral values) are compared with defined threshold values $D_s$ (see above). Spectral values in the transmission range ($D<D_s$) are multiplied by the correction function $c_2$ (see equation [12]), which is defined by the correction parameters located in the respective line of the table. Spectral values in the transition range ($D \sim D_s$) are not corrected. Spectral values in the absorption range ($D>D_s$) have logarithms taken, are multiplied by a density-dependent correction function $c_1$ (see equation [11]) and are then exponentiated again, the correction function $c_1$ typically being a polynomial of second order of the density and its coefficients likewise being part of the correction parameters. Since measurements are made with polarization filters, there is no surface effect and therefore $c_0$ can be set equal to zero. The corrected spectrum is then passed on to the control computer (50).

It is clear that, before the actual in-line correction, the correction database 41 first has to be set up. In order to determine the individual correction parameters, for all the cases of interest (see definition above), prints with defined areas are prepared and measured both with the in-line measuring configuration 20 and with an external measuring instrument. Since the correction parameters depend highly on the layer thickness, prints for each case of interest are prepared and measured for at least 3 different layer thicknesses in each case. From all this measured data, a set of correction parameters is then calculated for each individual case, this of course preferably being carried out with computer assistance.

In order to determine the correction parameters for a case, the spectra from the in-line measurements and the measurements registered externally are set against one another. In a first step, for each part of the spectrum, by using a defined threshold value, it is established whether this is located in the absorption, transmission or transition range of the color. In a second step, this is used to determine the correction parameters needed for these ranges, which define the correction functions $c_1$ and $c_2$ ($c_0$ is not needed in the case of measurement with polarization filters). The correction function $c_2$ is obtained by the spectral values of the transmission ranges from the measurements registered in-line and externally being divided by one another in each case and then averaged.

In order to obtain the density-dependent correction function $c_1$ for the absorption range chosen as a polynomial of 2nd order, in each case the density values from the measurements registered in-line and externally are divided by one another. Using the density-dependent ratios obtained in this way, the coefficients of the correction polynomial, and therefore the correction function $c_1$, are determined by the least squares method. The correction functions $c_1$ and $c_2$ and their parameters are then installed in the correction database 41 in a manner structured by cases.

The method according to the invention also permits the corrected values to be provided only after averaging or another process for compensating for fluctuations in the measured values. These fluctuations can be caused by the measurement technique but also originate in particular from the printing process and on their own. It is precisely in the case of offset printing that it has been known for a long time (e.g. "Offsetdrucktechnik" [Offset Printing Technology], Helmut Teschner) that the printing process is subject both to systematic and to random fluctuations, it being possible for these fluctuations also to be of a very short-term nature, that is to say in particular also from sheet to sheet. In the case of a conventional procedure, for the purpose of measurement an individual sheet is removed from the printing press after printing and is measured. The measured values obtained are then used, for example, for process control or displayed. Now, it would be entirely conceivable to measure a plurality of successive sheets here as well and to set the measured values against one another; in practice, however, this procedure is not followed for reasons of time. The consequence is that, in the conventional procedures, the measured values also reproduce the short-term fluctuations of the printing process. It is now one advantage of the method according to the invention that it is possible to set the measured values from a plurality of measuring times, in particular the measured values from a plurality of successive paper sheets measured in the machine, against one another without great expenditure of time, and therefore the measured values affected by short-term fluctuations can be cleaned and process parameters can consequently be estimated better. Therefore, in particular, the process control is able to operate more accurately.

It is also within the spirit of the method according to the invention that not only is it possible for the corrected measured values to be provided as described above directly following a correction of the in-line error but also for them to be subjected to further computational processing steps. One such processing step is, for example, the conversion between different measuring conditions. A case that is particularly relevant in practice is the conversion of measurements with different filters. For instance, if the corrected measured values are initially available as values measured with polarization filters, it may be necessary to compare these values with values measured without polarization filters, for the purpose of coordination with predefinitions from the prepress stage. A computational component for the conversion of values measured with polarization filters into values measured without polarization filters then fulfills this task.

We claim:

1. A method for determining color and/or density values for use in monitoring and regulating a printing process in a printing apparatus, which comprises the steps of:

measuring, photoelectrically, measuring areas of a printed sheet during a printing process, directly in or on the printing apparatus resulting in measured values;

determining from the measured values obtained in the printing process the color and/or density values for the measuring areas; and correcting computationally measured value deviations caused directly in the printing process with respect to a measurement performed outside the printing apparatus using the measured values.

2. The method according to claim 1, which further comprises further correcting the measured value deviations to some extent using a measurement technique.

3. The method according to claim 2, which further comprises using polarization filters during the measuring step to at least partly eliminate effects of ink splitting at a press nip and a surface change caused thereby.

4. The method according to claim 2, which further comprises using UV blocking filters during the measuring step to improve measured value reproducibility.

5. The method according to claim 2, which further comprises using a measuring geometry having an angular separation between a directed reflection of an illumination and a receiver of greater than 45° for at least partly eliminating effects of the ink splitting at a press nip and a surface change caused thereby.

6. The method according to claim 1, which further comprises:

carrying out the step of correcting the computationally measured value deviations such that the measured values derived from a first state, corresponding to the printed sheet being directly in the printing apparatus, being converted into second measured values of a second state, corresponding to a still wet printed sheet outside the printing apparatus; and converting the second measured values into third measured values of a third state, corresponding to a dry printed sheet outside the printing apparatus.

7. The method according to claim 6, which further comprises carrying out the step of correcting computationally the measured value deviations such that the first, second and third measured values from the first, second and third states can be converted mutually into one another.

8. The method according to claim 6, which further comprises carrying out a computational correction of the first, second and third measured values of the measuring areas in dependence on environmental parameters relevant to each measuring area with an aid of correction parameters, appropriate ones of the correction parameters being used for each set of the environmental parameters in question.

9. The method according to claim 8, which further comprises storing the correction parameters, together with the environmental parameters, in a database and the correction parameters can be retrieved selectively from the database by using the environmental parameters.

10. The method according to claim 9, which further comprises carrying out the step of correcting the measured value deviations by using three error types, which represent contributions to a measured value deviation from a surface effect, layer thickness modulation and light capture.

11. The method according to claim 10, which further comprises calculating the contribution to the measured value deviation of the surface effect, the layer thickness modulation and the light capture with the help of a corrective function, whereby the corrective function is defined by the corrective parameters.

12. The method according to claim 11, which further comprises carrying the step of correcting the measured value deviations on a basis of a color model.

13. The method according to claim 12, wherein the contribution to the measured value deviations from the layer thickness modulation is calculated as a multiplicative factor of a product of layer thickness and absorption coefficient or an extinction.

14. The method according to claim 12, wherein the contribution to the measured value deviations from the light capture is calculated by means of a modification of a refractive index of a color layer.

15. The method according to claim 12, wherein the contribution to the measured value deviations from the light capture is calculated by means of a multiplicative change to an internal integral refraction coefficient of an interface between a color layer and air.

16. The method according to claim 13, wherein the step of correcting the measured value deviations is carried out in a sequential correction cycle which comprises the steps of:

first calculating a level of diffuse reflection of the printed sheet by using a paper white measurement, the surface effect then being corrected;

calculating the extinction by using a color model that is inverse of the color model selected;

correcting the contribution to a measured value error from the layer thickness modulation by using the extinction;

correcting the contribution to the measured value error from the light capture by using the color model selected; and calculating a corrected reflectance value.

17. The method according to claim 10, which further comprises carrying out the step of correcting the measured value deviations directly on the measured values, the contribution to a measured value error from the layer thickness modulation being applied as a scaling error of a measured density value, and the contribution to the measured value error from the light capture being applied as a scaling error of a reflection factor.

18. The method according to claim 10, which further comprises:

applying separately, a correction of the contribution of a measured value error from the layer thickness modulation, and a correction of the contribution to the measured value error from the light capture, to different regions of a measured reflectance value, and where for the reflectance values whose density values calculated therefrom lie above a density threshold value only the contribution to the measured value error from the layer thickness modulation is corrected, and for all other reflectance values, only the measured value error contribution from the light capture is corrected.

19. The method according to claim 10, which further comprises carrying out a measured value correction from the second state into the third state on a basis of three measured value error contributions from the surface effect, the layer thickness modulation and the light capture, a second set of correction parameters analogous to those for the correction from the first to the second state being used, and the second set of correction parameters likewise being provided in the database.

20. The method according to claim 1, which further comprises storing generic correction parameters which are configured for typical paper grades and standard process colors in a correction database.

21. The method according to claim 20, which further comprises storing specific correction parameters which are configured for specific cases in which the generic correction parameters are inapplicable or inaccurate in the correction database.

22. The method according to claim 8, which further comprises calculating the correction parameters from the measured values from prints produced with systematically varied environmental parameters in the first state and from reference measured values from the prints in the second and/or third state.

23. The method according to claim 22, which further comprises measuring the reference measured values by using an external measuring instrument which is equipped with equivalent measuring filters as an internal measuring configuration within the printing apparatus.

24. The method according to claim 23, which further comprises eliminating differences in spectral resolution between the external measuring instrument and the internal measuring configuration by using a numerical band pass correction.

25. The method according to claim 23, which further comprises:

using the external measuring instrument having a plurality of changeable measuring filters for measuring the reference values; and carrying out the reference measurements in various measuring modes of the external measuring instrument, it being possible for measured data to be interchanged between the internal measuring configuration and other measuring systems having other measuring filters.

26. The method according to claim 23, which further comprises in a case in which a measured density on a reference sheet does not correspond to a required desired density, the measured values transformed for the required measuring filter are adapted by using a correction step.

27. The method according to claim 1, which further comprises using a sheet-fed offset printing press as the printing apparatus.

28. A printing apparatus, comprising:

an in-line measuring configuration for photoelectrically measuring of measuring points of a printed sheet directly during a printing process resulting in measured values;

a device for forming color and/or density values for relevant measuring points from the measured values; and a correction computer for correcting computationally measured value deviations caused by a measurement directly in the printing process with respect to a measurement outside the printing process, said correction computer connected to said in-line measuring configuration.

29. The printing apparatus according to claim 28, wherein said in-line measuring configuration suppresses, at least partly, a proportion of the measured value deviations caused by a surface effect.

30. The printing apparatus according to claim 29, wherein said in-line measuring configuration has polarization filters.

31. The printing apparatus according to claim 30, wherein said in-line measuring configuration has a UV blocking filter.

32. The printing apparatus according to claim 28, wherein said in-line measuring configuration has a measuring geometry deviating from a standardized measuring geometry 0°/45°, said in-line measuring configuration having an illumination channel and a receiver channel, measuring angles defined by said illumination channel and said receiver channel being chosen such that they are disposed on a same side of a normal to a measuring plane and corresponding path lengths of main beams of said receiver channel and said illumination channel in a color layer are identical to the standardized measuring geometry.

33. The printing apparatus according to claim 28, wherein said correction computer is programmed to:

determine from the measured values obtained in the printing process the color and/or density values for the measuring areas; and correct computationally measured value deviations caused directly in the printing process with respect to a measurement outside the printing process from the measured values.

34. The printing apparatus according to claim 28, wherein the printing apparatus is a sheet-fed offset printing machine.

* * * * *